United States Patent Office.

WILLIAM ZIEGLER AND JOHN H. SEAL, OF NEW YORK, N. Y.

Letters Patent No. 109,364, dated November 15, 1870.

IMPROVEMENT IN FLAVORING-COMPOUNDS.

The Schedule referred to in these Letters Patent and making part of the same.

*To all whom it may concern:*

Be it known that we, WILLIAM ZIEGLER and JOHN H. SEAL, both of the city, county, and State of New York, have invented an Improved Flavoring-Compound; and we do hereby declare that the following is a description of our invention sufficient to enable those skilled in the art to practice it.

An acceptable and economical dry-flavoring compound has long been needed, especially for bakers and confectioners.

The advantages of applying the flavoring, of whatever kind, in the dry, rather than in the liquid, state, are many, among which may be named the following, namely:

It may be better worked into the body of the material, as in candy-making, and will not, like a fluid extract, run off from and refuse to mix with the melted sugar.

In ice-cream the liquid takes longer to freeze because of the alcohol usually contained in it, and retards the making of the article and increases the consumption of ice required, and also tends to curdle the milk or eggs. So also in the making of custards.

In the pulling of candies while warm, the fluid extract, when poured upon the candy, is volatile and flies off. It also drops off by gravity, and fails to cling to and mix with it as it would if solid, the heat of the mass, in the latter case, melting the flavoring particles and causing them to adhere to and become worked directly into the candy without waste.

In the manufacture of our compound we use magnesia instead of alcohol or spirits, and intermix it with the flavoring article and with sugar, as hereafter set forth.

We employ magnesia in order to cut or subdivide the particles of the oils which may exist in the flavoring material, and so that it will readily mingle with the moisture or water in the pudding or other article of food to be flavored.

By way of illustrating the mode of preparation, we will now describe the manufacture of a dry-lemon flavoring-compound according to our invention.

*Formula for Lemon.*

In the case where we combine both the fruit-flavoring and the oil of lemon we take the peel or skin of, say, one hundred fresh lemons, a half pound of fresh oil of lemon, a half pound of carbonate of magnesia, and seven pounds of sugar, (granulated preferred.)

We then grate off the outside of the lemon-peel and mix it with the oil.

We next take about two-thirds of the sugar and magnesia, mixed, and mix it with the oil and grated peel. It is then ready for grinding.

The reason for taking two-thirds instead of all of the sugar and magnesia is not one of necessity, but merely of economy, and to avoid waste, because, with the lemon-peel, as with some other articles, it is found sometimes that, after grinding, some of the peel is left not thoroughly ground. It is advisable, therefore, in such cases to put such unground portion with the remainder of the magnesia and sugar, and grind it over again.

The above formula will answer also for orange, bitter almond, tonquas, &c., and also for vanilla and pistachio, except that no oil of vanilla or pistachio is used.

In bitter almonds the oil is found strong enough without using the almond-nut.

When we dispense with the peel of fruits or the meat of nuts we triturate the oil with magnesia, and then mix with sugar and reduce to powder, and it is ready for use.

When we use ethers, they are first triturated with magnesia, and are then mixed with sugar and powdered, and are ready for use.

For grinding we prefer a stone mill, or, for small quantities, a porcelain mortar.

It will be observed that, in our process of manufacture, there is no fluid extract first made, and then a conversion of such fluid into solid extract by evaporation, the great cost and waste incident to such mode of manufacture being entirely avoided by us. Nor would such flavoring extracts be available for common and every-day use by the public, as they are altogether expensive, and not as strong as by our process.

It will also be seen that there is not only great economy in the use of our compounds, but also in their manufacture, as we utilize all the flavor contained in the original substance, instead of loosing a considerable portion in the process of extraction, as heretofore.

In applying the flavoring-compound to the articles of food to be flavored, the sugar with which it is intermixed also, to a considerable extent, serves for the necessary sweetening.

In a commercial point of view there is a great advantage in our compounds as compared with liquid extracts, as they may be done up in any kind and size of convenient package, without the need of fragile glass, or corking or sealing, and transported with safety anywhere, with no risk of loss or damage from breakage.

There is also far greater convenience and comfort of handling when in a dry state, and it is easier and safer kept.

It will be evident that the proportions of the compound may be varied according to the character of the flavoring substance and its strength, and according to the use to which it is to be put, and to the intensity of flavor required.

We claim—

A dry-flavoring compound, formed of magnesia, sugar, and the flavoring substance, ground or pulverized to form a powder, substantially as above set forth.

WM. ZIEGLER.
JOHN H. SEAL

Witnesses:
JOHN L. LINDSAY,
JESSE K. VREELAND.